US009317360B2

(12) United States Patent
Vargas et al.

(10) Patent No.: US 9,317,360 B2
(45) Date of Patent: Apr. 19, 2016

(54) MACHINE CHECK SUMMARY REGISTER

(75) Inventors: Jose A. Vargas, Rescue, CA (US);
Mohan J. Kumar, Aloha, OR (US);
James B. Crossland, Banks, OR (US);
Murugasamy K. Nachimuthu,
Beaverton, OR (US); Theodros Yigzaw,
Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 13/995,458

(22) PCT Filed: Dec. 29, 2011

(86) PCT No.: PCT/US2011/067935
§ 371 (c)(1),
(2), (4) Date: Jun. 18, 2013

(87) PCT Pub. No.: WO2013/101111
PCT Pub. Date: Jul. 4, 2013

(65) Prior Publication Data
US 2013/0339829 A1 Dec. 19, 2013

(51) Int. Cl.
G06F 11/00 (2006.01)
G06F 11/08 (2006.01)
G06F 11/22 (2006.01)
G06F 11/10 (2006.01)
G06F 11/07 (2006.01)

(52) U.S. Cl.
CPC ........ G06F 11/1004 (2013.01); G06F 11/0724 (2013.01); G06F 11/0793 (2013.01)

(58) Field of Classification Search
None
See application file for complete search history.

(56) References Cited

U.S. PATENT DOCUMENTS

| 6,502,208 | B1 | 12/2002 | McLaughlin et al. |
| 7,774,683 | B2* | 8/2010 | Keays et al. ................... 714/765 |
| 7,861,106 | B2* | 12/2010 | Avizienis ........................... 714/2 |
| 7,966,480 | B2* | 6/2011 | Catherwood ................. 712/244 |
| 8,195,986 | B2* | 6/2012 | Meaney et al. ................... 714/48 |
| 2002/0029358 | A1* | 3/2002 | Pawlowski et al. ............. 714/39 |
| 2004/0078732 | A1* | 4/2004 | Meaney .......................... 714/57 |
| 2006/0143515 | A1 | 6/2006 | Kuramkote et al. |
| 2009/0217108 | A1 | 8/2009 | Meaney et al. |
| 2009/0327572 | A1* | 12/2009 | Cho et al. .......................... 711/5 |
| 2013/0007507 | A1* | 1/2013 | Raj et al. ...................... 714/5.11 |
| 2014/0298140 | A1* | 10/2014 | Yigzaw et al. ................ 714/768 |

OTHER PUBLICATIONS

Shanley, Tom, Pentium Pro and Pentium II System Architecture, Mindshare Inc., 1998, 2nd Edition, p. 479-480.*
PCT International Search Report for PCT Counterpart Application No. PCT/US2011/067935, 3 pgs., (Sep. 27, 2012).

(Continued)

Primary Examiner — Justin R Knapp
(74) Attorney, Agent, or Firm — Nicholson De Vos Webster & Elliott LLP

(57) ABSTRACT

In some implementations, a processor may include a machine check architecture having a plurality of error reporting registers able to receive data for machine check errors. A summary register may include a plurality of settable locations that each represents at least one of the error reporting registers. One or more of the settable locations in the summary register may be set to indicate whether one or more of the error reporting registers maintain data for a machine check error. Accordingly, when a machine check error occurs, the summary register may be accessed to identify if any error reporting registers in a processor's view contain valid error data, rather than having to read each of the error reporting registers in the processor's view.

18 Claims, 8 Drawing Sheets

(56) References Cited

OTHER PUBLICATIONS

PCT Written Opinion of the International Searching Authority for PCT Counterpart Application No. PCT/US2011/067935, 3 pgs., (Sep. 27, 2012).

PCT Notification concerning Transmittal of International Preliminary Report on Patentability (Chapter I of the Patent Cooperation Treaty) for PCT Counterpart Application No. PCT/US2011/067935, 5 pgs., (Jul. 10, 2014).

* cited by examiner

102↘

204↗

| 202 | MC0 Valid | 0 |
| 202 | MC1 Valid | 1 |
| 202 | MC2 Valid | 2 |
| 202 | MC3 ERROR | 3 |
| 202 | MC4 Valid | 4 |
| 202 | MC5 Valid | 5 |
| | ⋮ | |
| | MCi Valid | 6 ⋮ 58 |
| | ⋮ | |
| 202 | MC59 Valid | 59 |
| 202 | MC60 Valid | 60 |
| 202 | MC61 Valid | 61 |
| 202 | MC62 Valid | 62 |
| 202 | MC63 Valid | 63 |

MACHINE CHECK SUMMARY REGISTER

CROSS-REFERENCE TO RELATED APPLICATIONS

This patent application is a U.S. National Phase Application under 35 U.S.C. §371 of International Application No. PCT/US2011/067935, filed Dec. 29, 2011, entitled MACHINE CHECK SUMMARY REGISTER.

TECHNICAL FIELD

This disclosure relates to the technical field of microprocessors.

BACKGROUND ART

Machine check architecture provides a mechanism for detecting and reporting hardware (machine) errors. The machine check architecture may employ machine check banks that include one or more error reporting registers for receiving data related to detected machine check errors. A processor may signal the detection of an uncorrected machine check error by generating a machine check exception, which may be reported to an operating system, a virtual machine manager, or other system software. Typical errors reported as machine check exceptions may include: system bus errors; ECC (error correction code) errors; parity errors; cache errors; and TLB (translation lookaside buffer) errors. When a machine check exception is generated, a machine check handler can collect information about the machine check error from the machine check registers. However, when a system has a large number of processors, logical processors, or the like, each having a number of error reporting registers in its view, a machine check handler for each processor or logical processor may have to read a very large number of machine check banks to locate a valid error.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example summary register according to some implementations.

DETAILED DESCRIPTION

Reducing MCA Bank Accesses

Figure 1:
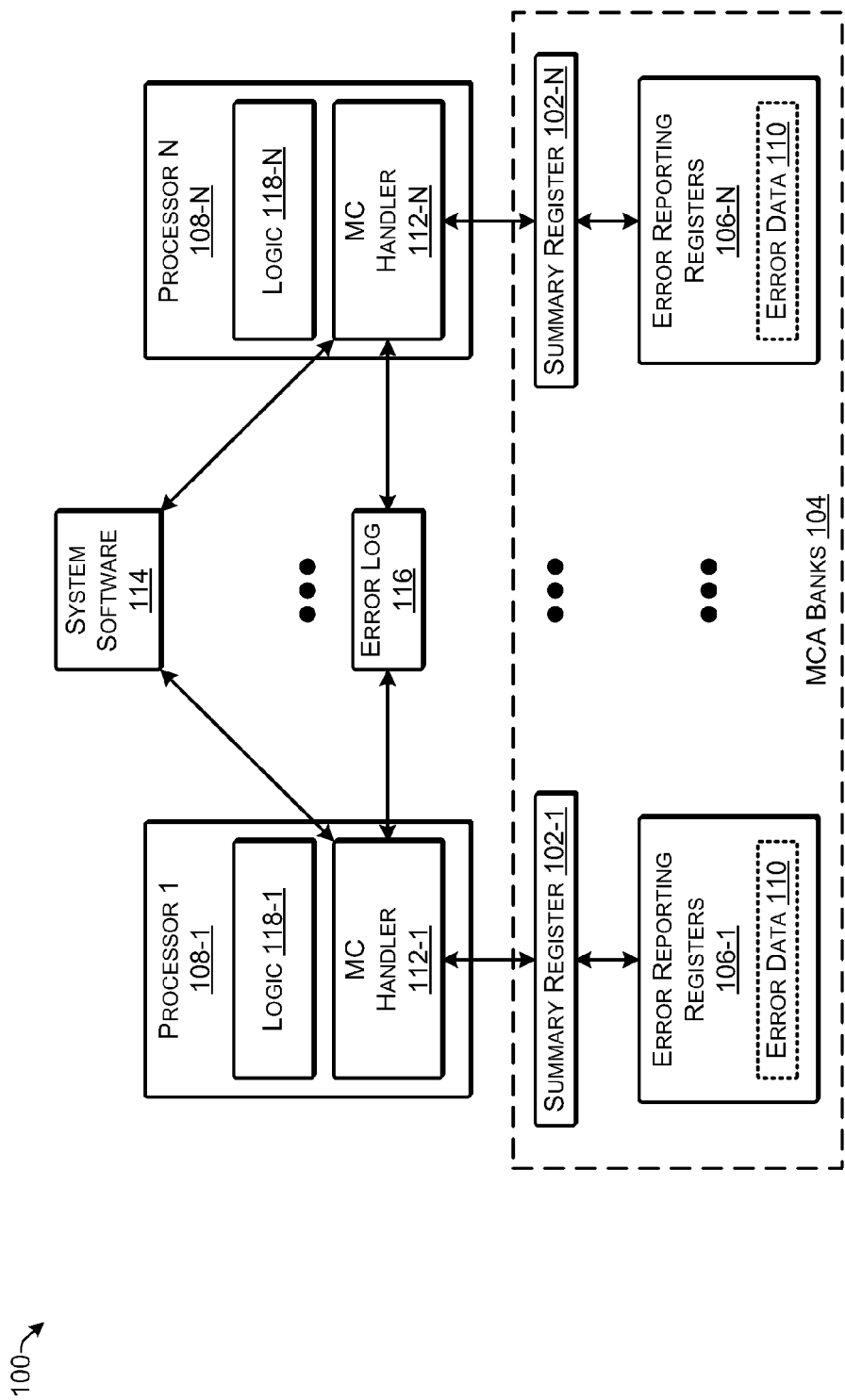
FIG. 1 illustrates an example machine check architecture having at least one summary register that is included with a plurality of machine check architecture banks according to some implementations.

This disclosure includes techniques and arrangements for reducing or limiting a number of accesses to machine check architecture (MCA) banks Some implementations may include one or more summary registers associated with one or more sets of error reporting registers in an MCA bank. As one example, the summary register may provide the ability to identify, based on a single read operation, one or more specific MCA banks that have a valid error following broadcast of a machine check exception (MCE). In some instances, a separate summary register may be provided for each processor, logical processor, or the like. The summary register may represent in a bitwise fashion whether an error exists for the MCA banks in the processor's view, i.e., the MCA banks that correspond to the particular processor.

In some implementations, the summary register may be a model specific register (MSR) that has a number of storage locations or settable bits, each of which corresponds to a different MCA bank out of a plurality of MCA banks in a particular processor's view. As used herein, the processor may be a single processor, one or more processor cores of a multi-core processor, one or more logical processors, and/or one or more virtual processors. In some examples, the settable locations in the summary register may be capable of retaining settable bits, such as to provide a register bit mask. Each settable bit in the summary register may represent a different MCA bank of the plurality of MCA banks corresponding to the particular processor. Thus, when a given MCA bank has valid error data, then its corresponding bit is set in the summary register. On the other hand, the bits in the summary register will be clear (i.e., not set) for all of the other MCA banks in the processor's view that do contain valid error data.

As an example, when a machine check error occurs, an MCE may be delivered to one or more processors in a system. In some implementations, the MCE may be broadcast to all the processors in a system or to all the processor cores on a particular processor to halt processing, thereby preventing propagation of the error, passing of incorrect data, or the like. A software-implemented machine check (MC) handler corresponding to each particular processor that receives the MCE may read the summary register that corresponds to that particular processor. Based on the information in the summary register, the MC handler can detect whether an MCA bank in the particular processor's view has valid error data. For example, if there is an uncorrected fatal error in a first logical processor maintained in a particular MCA bank in the first logical processor's view, then the summary register will only have a particular bit set that corresponds to the particular MCA bank. Thus, the MC handler reads the summary register and notes that only the particular MCA bank has a valid error out of a plurality of possible MCA banks Consequently, the MC handler for the first processor only reads the particular MCA bank identified by the summary register instead of reading all of the MCA banks in the view of the first processor (e.g., 32 or more MCA banks in some implementations). In addition, for the other processors in the system that have no valid errors (e.g., processors that received the broadcast MCE but did not experience the error), the MC handler(s) for those other processors will not find any valid errors in the summary registers corresponding to those processors. Accordingly, the MC handlers for the other processors will not have to read the respective MCA banks in their view, which can provide a significant performance savings. For instance, because MCA banks are typically made up of MSRs, the reading and writing of these registers is relatively slow, which can cause delay in resolving an error, particularly in view of a current trend toward increasing the number of MCA banks.

In some examples, the summary register can be more than one register, for example, a first summary register may represent valid uncorrected fatal errors, a second summary register may represent valid uncorrected recoverable errors, and a third summary register may represent valid corrected errors. In some implementations, an operating system (OS) may provide the MC handlers for each processor, and may further provide functionality for initiating recovery from an error. Additionally, in a virtualized environment, a virtual machine monitor (VMM) may trap accesses to the MCA banks to determine whether the accesses are allowed, and if allowed, the VMM may perform the read/write for the software attempting the access. Thus, in the case that a VMM is utilized, the summary register according to some implementations herein may significantly reduce the number of MCA bank reads. Consequently, the summary register herein may reduce the performance impact due to traps by VMM software during accessing of MCA banks.

Some MCA features may enable recovery from MCEs in certain situations. Thus, MCEs may signal nonfatal events in which the expectation is that system software can handle the event and continue running the system. In some implementations herein, timeliness in error handling is a factor to avoid system shutdown. From a software flow perspective, in response to an MCE, the MC handler for a particular processor may first read the corresponding summary register to detect whether any bits are set in the summary register. If the summary register is clear (i.e., no bits are set), then there is not a valid error on or related to the particular processor, and no valid error data is maintained in the MCA banks corresponding to the particular processor. On the other hand, when one or more bits are set in the summary register, then, in some examples, those bits correspond directly to MCA banks that have valid error data. Accordingly, from the summary register, the MC handler may directly identify which MCA bank in a particular processor's view contains valid error information. This eliminates the need to read all the MCA banks in the processor's view just to detect whether there is valid error information.

Further, in a virtualization configuration, by identifying which MCA bank has valid error data through reading a single summary register, the number of MCA bank accesses may be significantly reduced. As one concrete nonlimiting example, in a virtualization configuration that includes the summary register, one valid error may result in only five or fewer register accesses, e.g., access to the summary register and up to four other error reporting registers in an identified MCA bank. On the other hand, without the summary register, for a logical processor with 32 MCA banks, a minimum of 32 register accesses may be employed to identify one of the MCA banks that has valid error data. Thus, when a single valid error exists in one of the MCA banks for a processor with 32 MCA banks, the number of MCA bank accesses may be as many as 36 register accesses. Further, when register trapping is considered, utilization of the summary register significantly reduces the time for the system software to take action on a given error. Additionally, in some implementations, the summary register(s) may be architecturally defined in advance to enable the operating system and/or virtual machine monitor software to utilize the summary registers and fully realize the savings in the number of MCA bank accesses required.

Some implementations are described in the environment of multiple logical processors corresponding to one or more cores in a processor. However, the implementations herein are not limited to the particular examples provided, and may be extended to other types of processor architectures, multiple processors, multiple cores, and multiprocessor systems, as will be apparent to those of skill in the art in light of the disclosure herein.

Example Machine Check Architecture

FIG. 1 illustrates an example machine check architecture 100 having at least one summary register 102 that is included with a plurality of machine check architecture (MCA) banks 104 according to some implementations. In the illustrated example, multiple summary registers 102-1, . . . , 102-N (where N is a positive integer≥1) are provided, each corresponding to a set of error reporting registers 106-1, . . . , 106-N, and a processor 108-1, . . . , 108-N. The processors 108 may be physical processors, logical processors and/or virtual processors, and may be processor cores of a larger processor, may be single core processors, or other variations. In some implementations, each processor 108 may have a set of error reporting registers 106 that correspond to that particular processor 108 for receiving and maintaining valid error data 110 pertaining to machine check errors related to the particular processor 108 when an error occurs.

Each processor 108-1, . . . , 108-N may include or may have associated therewith a machine check (MC) handler 112-1, . . . , 112-N to process machine check exceptions (MCEs), machine check interrupts and, when possible, enable the processor 108 in recovering from any errors. For example, the MC handler 112 may be software, code, executable instructions, or the like, included in an operating system (OS), a virtual machine monitor (VMM) or other system software 114. In some examples, the MC handler 112 may be specific to the particular type or class of processor 108 to interpret and respond to the machine check encodings generated for the processor 108. Further, the MC handler 112 may handle different types of machine check errors, and in some cases, the MC handler 112 may include several different types of software-implemented handlers for responding to different types of MC errors. For instance, as mentioned above, in some implementations, the system software 114 may provide the MC handler 112 to recover from uncorrected recoverable machine check errors. This allows the system software 114 to perform a recovery action on a certain class of uncorrected errors and continue execution. Accordingly, when software error recovery support is available for the processors 108, the MC handler 112 may initiate software error recovery. On the other hand, when there is no support for error recovery from the processors 108, the MC handler 112 may record the machine check valid error data 110 in an error log 116 and shut down the system.

As one nonlimiting example, uncorrected recoverable (UCR) errors are uncorrected errors that have been detected and signaled but have not corrupted the processor context. For certain UCR errors, this means that once system software 114 has performed a certain recovery action, it is possible to continue execution on the processor 108 affected by the error. The machine check handler 112 may use the valid error data 110 from the error reporting registers 106 to analyze and implement specific error recovery actions for UCR errors.

In some examples herein, the MC handler 112 may correspond to at least one of a machine-check exception handler or a corrected machine-check interrupt handler. To respond to a machine check exception, the OS or other system software 114, such as a hypervisor or VMM, may provide the MC handler 112 for each processor 108. The MC handler 112 may further include the capability to log valid error data 110 in the error log 116. Accordingly, in some implementations, the machine check architecture 100 along with error logging can be used in several different ways, such as detecting machine errors during normal instruction execution based on machine check exceptions; checking and logging machine errors; examining recoverable UCR errors to determine software recoverability; and performing recovery actions using the MC handler 112.

Each processor 108-1, . . . , 108-N may also include or may have associated therewith logic 118-1, . . . , 118-N to manage the respective summary register 102 for that processor 108, such as for setting or clearing bit locations in the summary register 102. In some instances, logic 118 may include one or more dedicated circuits or logic units that perform setting or clearing of bit locations in the summary register 102. In other implementations, logic 118 may include microcode executed on a micro-control unit or the processor 108 to perform functions to manage the summary register(s) 102. Thus, when valid error data 110 is stored into a particular one of the error reporting registers 106 a valid bit in the error reporting register 106 is set, and the settable location in the summary register 102 that corresponds to the particular error reporting register 106 may be set to indicate that the particular error reporting register 106 contains valid error data 110.

In some implementations, the processors 108 may provide both internal and external machine check mechanisms, such as for checking the operation of internal chip hardware and bus transactions. When a machine check error is detected, a processor may signal an MCE (e.g., as a vector) and return an error code. Accordingly, when a machine check error occurs, valid error data 110 for the error is stored into a particular error reporting register 106 and an MCE corresponding to the error is broadcast to one or more of the processors 108 in the machine check architecture 100. For example, in some implementations, the MCE may be broadcast to all of the processors 108 in the system as an error containment mechanism to prevent propagation of the error, dissemination of corrupted data, or the like. In response to the MCE, processing at each processor 108 may cease, and the MC handler 112 for each processor 108 may access the summary register 102 for the particular processor 108 to determine whether the error is at or related to the particular processor 108. If one or more bits are set in the respective summary register 102, the MC handler 112 may identify a particular error reporting register 106 or a particular bank of error reporting registers 106 that contains valid error data 110. On the other hand, if there are no bits set in the summary register 102, the MC handler 112 may determine that the error affects a different processor 108 and may await action to initiate recovery from the error.

Accordingly, the summary registers 102 substantially reduce the number of accesses or reads to the error reporting registers 106 by the MC handler 112. For example, when a particular processor 108 is not a source of or related to the error, the MC handler 112 for that processor 108 merely performs an access to the respective summary register 102 for that processor 108, rather than reading all of the error reporting registers 106 that correspond to the particular processor 108. Further, even when a particular processor 108 is the source of the error, the number of register reads is still reduced because the MC handler 112 can read the summary register 102 to determine which of the error reporting registers 106 contains valid error data 110. The MC handler 112 can then read just the identified error reporting register(s) 106 or register bank, rather than reading all of the error reporting registers 106 for that processor 108. In addition, only the MC handler 112 for the particular processor 108 may log the error to the error log 116, rather than having each MC handler 112 for each processor 108 log the error.

Example Summary Register

FIG. 2 illustrates an example summary register 102 according to some implementations herein. The summary register 102 includes a plurality of storage locations or settable locations 202, which serve as indicators of the presence of valid error data 110 in one or more corresponding error reporting registers 106. In some examples, the summary register 102 may include a number of settable locations 202 that correspond to a number of error reporting registers 106 that the summary register 102 represents. In other examples, as discussed below, the error reporting registers 106 may be grouped into banks of registers (i.e., MCA banks), and each settable location 202 may correspond to a particular bank of one or more registers 106. Other variations will also be apparent to those of skill in the art in view of the disclosure herein.

In the illustrated example of FIG. 2, the summary register 102 includes 64 settable locations 202, which may correspond to 64 error reporting registers 106 or 64 banks of error reporting registers that are represented by the summary register 102. Thus, in this example, a settable storage location 3 of the summary register 102 indicates that valid error data 110 is contained in a corresponding error reporting register or register bank "MC3." The remainder of the settable locations 0-2 and 4-63 indicate that no valid error data is contained in the corresponding error reporting registers or register banks. Consequently, by reading the summary register 102, an MC handler 112 may quickly identify the error reporting register 106 or bank of registers that contains valid error data 110.

In some implementations, the plurality of settable locations 202 may simply provide a bit mask 204 in which each settable location maintains a settable bit. For example, if the bit is clear i.e., a "0," then there is no valid error data maintained in the corresponding error reporting register or register bank. On the other hand, if the bit is set to "1," then the corresponding error reporting register 106 or register bank may maintain valid error data 110. Of course, the meanings of the one or zero bits may be reversed, or other techniques may be used to represent the presence of valid error data in an error reporting register 106 or register bank, with the foregoing being just one example.

In addition, in some implementations, a single summary register 102 may represent more than one kind of error or more than one type of error reporting register. For example, a summary register 102 may have 128 settable locations 202 for representing 64 error reporting registers or register banks of a first type and 64 error reporting registers or register banks of a second type. Alternatively, multiple summary registers 102 may be provided for each processor or logical processor for representing different types of error reporting registers or register banks. For example, a first summary register may represent error reporting registers for fatal errors and uncorrected recoverable errors, while a second summary register may represent corrected machine check interrupts. Thus, in some implementations, as discussed below, an additional summary register 102 may be provided for representing error reporting registers that receive CMCI interrupts for corrected and poisoned errors. In this case, the MC handler 112 may include capability to manage the multiple types of errors.

Example Processor Architectures

Figure 3:
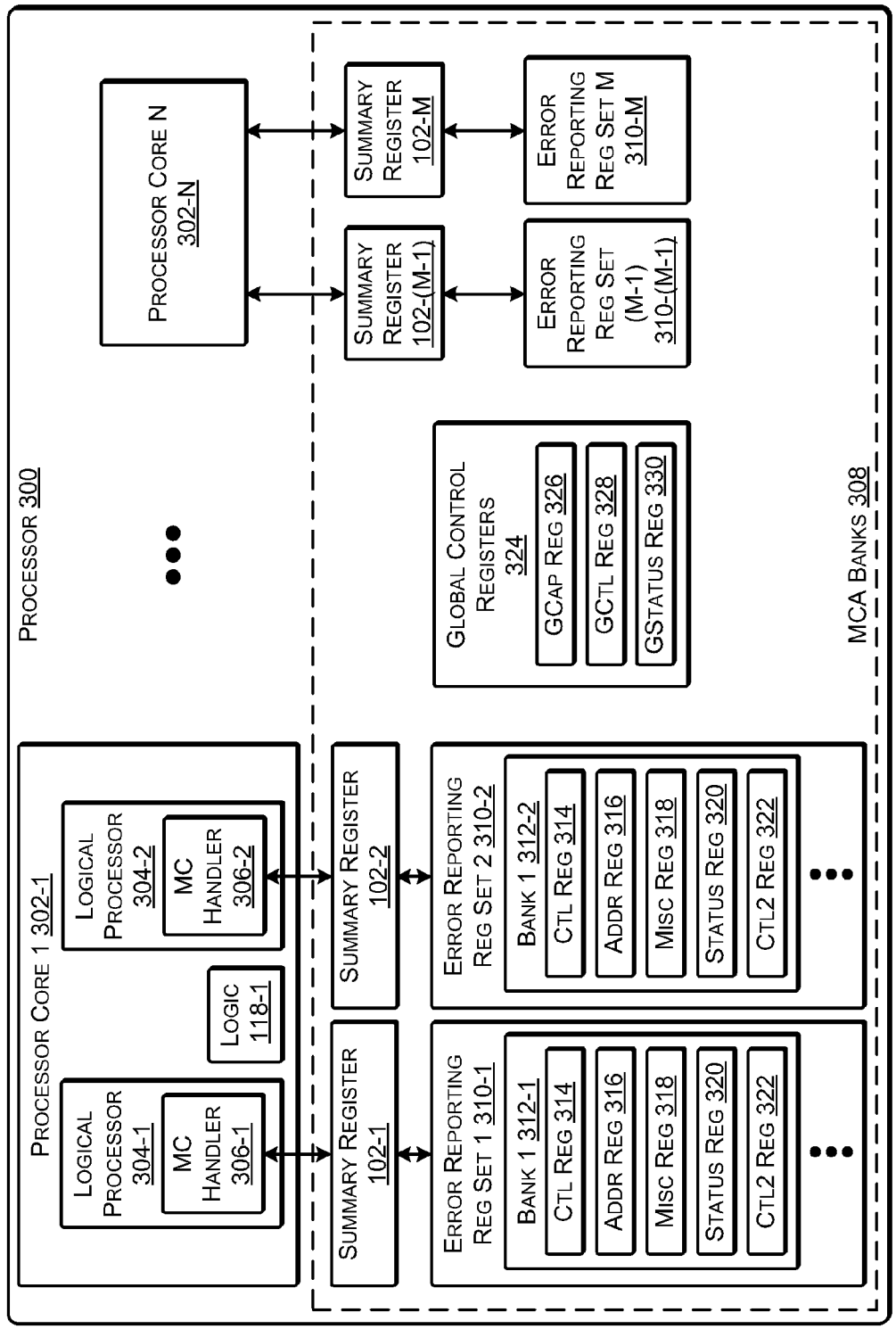
FIG. 3 illustrates an example processor architecture including one or more summary registers according to some implementations.

FIG. 3 illustrates an example architecture of a processor 300 according to some implementations herein. In this example, the processor 300 includes a plurality of processor cores 302-1, ..., 302-N. Details of processor core 302-1 will be described. In some instances, each of the other processor cores 302 may have a configuration similar to that of processor core 302-1. Processor core 302-1 may be operated to provide two or more logical processors, such as a first logical processor 304-1 and a second logical processor 304-2. For example, logical processors 304-1, 304-2 may be implemented through the use of hyperthreading technology or other suitable technology to maximize utilization of the processor core 302-1. In addition, each logical processor 304 may have an MC handler 306 associated therewith, which may correspond to the MC handlers 112 discussed above. For example, the MC handlers 306 may be provided by an OS or other system software 114 (not shown in FIG. 3) for each logical processor 304 implemented on the processor 300.

The processor core 302-1 may further include logic 118-1, as described above, for managing one or more summary registers 102 that are affiliated with the processor core 302-1. For example, a first summary register 102-1 may be provided for the first logical processor 304-1 and a second summary register 102-2 may be provided for the second logical processor 304-2. Thus, each logical processor 304-1, 304-2 may have a respective summary register 102-1, 102-2 that represents at least some of the error reporting registers owned by or corresponding to the processor core 302-1. However, in other implementations, a single summary register 102 may be shared by the logical processors 304-1, 304-2 that also share the processor core 302-1.

In the illustrated example of FIG. 3, the processor 300 includes MCA banks 308 that include the summary registers 102-1, 102-2, ..., 102-M, and error reporting register sets 310-1, ..., 310-M (where M is a positive integer>1). In some examples, the summary registers 102 and/or the error reporting registers in the error reporting register sets 310 may be model specific registers (MSRs). For instance, each logical processor 304 may have an error reporting register set 310 in its view, i.e., a group or set of registers that receive and/or report error information pertaining to the corresponding logical processor 304 and the processor core 302. The error reporting register set 310 may include a plurality of banks 312 of registers. For example, there may be 32 or more separate banks 312 of error reporting registers that correspond to each logical processor 304.

As a nonlimiting example, each bank 312 of registers may include one or more of a control register (Ctl Reg) 314, an address register (Addr Reg) 316, a miscellaneous register (Misc Reg) 318, a status register (Status Reg) 320, and a control-2 register (Ctl2 Reg) 322. The control register 314 may control error reporting for MC errors produced by a particular hardware unit or group of hardware units. The address register 316 may contain the address of the code or data memory location that produced a particular machine check error. The miscellaneous register 318 may contain additional information describing the machine check error to support software recovery of uncorrected errors. The status register 320 may contain information related to a machine check error if its VAL (valid) flag is set. For example, the status register 320 may indicate an error code that specifies an MCA-defined error code for a particular machine check error condition that is detected.

The control-2 register 322 may provide a programming interface or other information to enable corrected MC error signaling. For example, the control-2 register 322 may enable the generation of a corrected machine check error interrupt (CMCI). In some implementations, the control-2 register 322 may be shared between two logical processors 304 that share a processor core 302. Some micro-architectural subsystems that are the source of corrected MC errors may be shared by more than one logical processor 304. Consequently, the facilities for reporting MC errors and controlling mechanisms may be shared by more than one logical processor 304. For example, as mentioned above, some control-2 registers 322 or other types of error reporting registers may be shared between logical processors 304-1 and 304-2 that share a processor core 302-1, or shared between processor cores 302.

The MCA banks 308 may further include one or more global control registers 324, which may also be MSRs in some implementations. Nonlimiting examples of global control registers 324 include a global cap register (GCap Reg) 326, a global control register (GCtrl Reg) 328, and a global status register (GStatus Reg) 330. For example, the global cap register 326 may provide information about the machine check architecture of the processor 300. The global control register 328 may control the reporting of MCEs. The global status register 330 may maintain a restart instruction pointer valid flag, an error instruction pointer valid flag, and a machine check in progress flag. Further, it should be noted that the configuration of FIG. 3 is just one nonlimiting example provided for discussion purposes, and that numerous other configurations, types of registers, types of MCA banks, and the like are possible, as will be apparent to those of skill in the art in light of the disclosure herein.

In the case that MCEs are broadcast to all the processor cores 302 on a single socket, without the benefit of the summary registers 102, each MC handler 306 might conventionally read all the banks 312 in its view to identify which bank 312, if any, has valid error data. This approach may consume a considerable amount of time. Thus, in some implementations herein, in response to an MCE, the MC handler 306 for each logical processor 304 may simply access the respective summary register 102 to determine if the error relates to the particular logical processor 304. Further, the MC handler 306, at least in part due to shared error reporting registers, such as the control-2 registers 322, may serialize access to the MCA banks 308 to properly handle errors (e.g., recoverable errors). Accordingly, on a processor 300 with a large number of logical processors 304, each having a large number of banks 310, the summary registers 102 herein can significantly decrease the delay that would otherwise result from reading each of the banks 312 of error reporting registers, since the MC handler 306 does not read the banks 312 that do not have valid error data. Accordingly, implementations herein provide a mechanism for the OS, VMM or other system software 114 to quickly and easily identify which banks 312 have valid error data, and read only those banks 310, rather than all the banks 312 within the processor's view. Thus, implementations herein can significantly reduce the time to handle machine check errors by providing a summary of the valid errors in the logical processor's view by a single read of the corresponding summary register, thereby significantly reducing the overhead of the MC handler 306.

Figure 4:
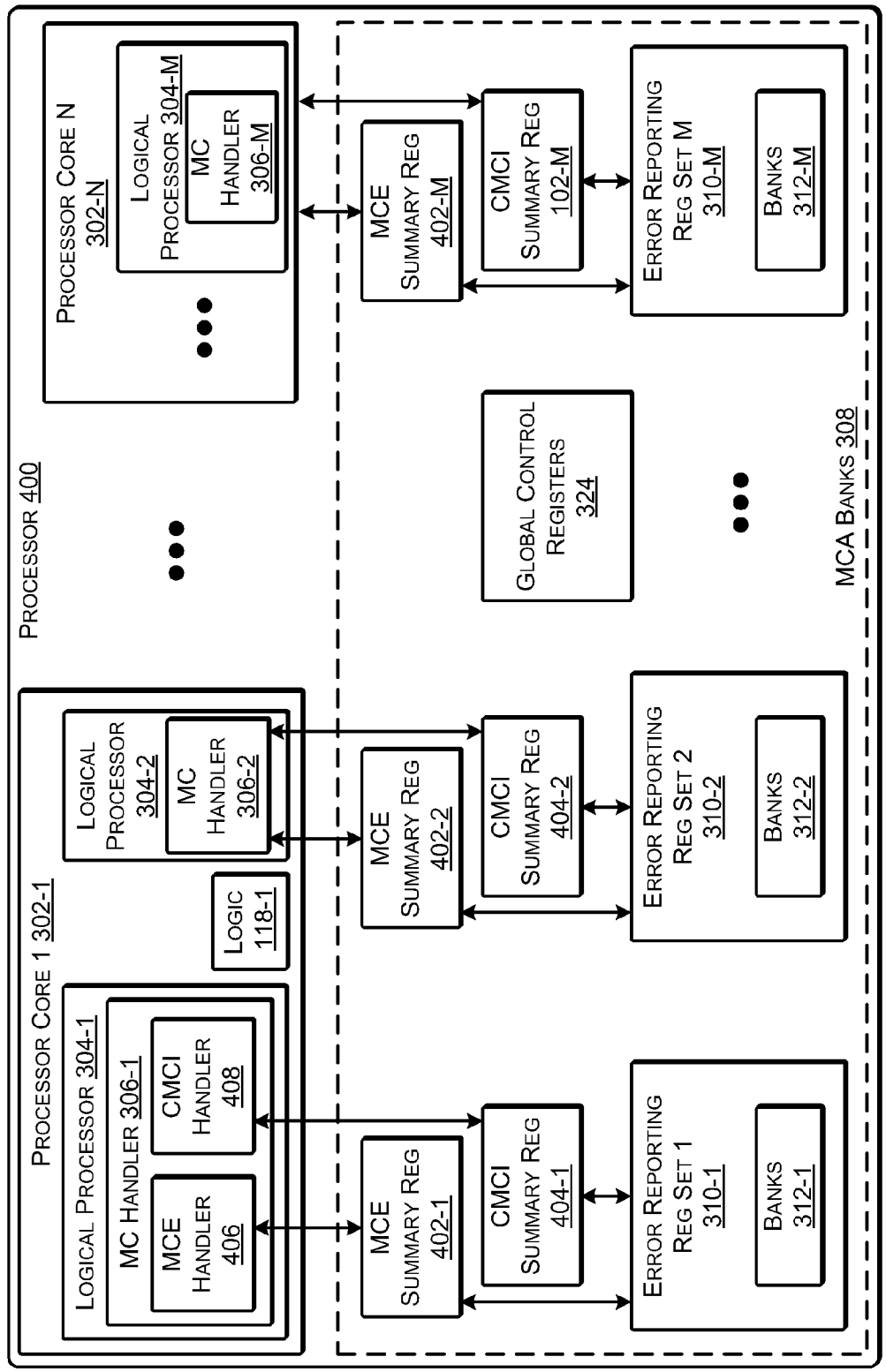
FIG. 4 illustrates an example processor architecture including a plurality of summary registers per logical processor according to some implementations.

FIG. 4 illustrates an example architecture of a processor 400 according to some implementations herein. The processor 400 may include the plurality of processor cores 302-1, ..., 302-N, and MCA banks 308 that include the error reporting register sets 310-1, 310-2, ..., 310-M, banks 312-1, ..., 312-M, and global control registers 324, as discussed above with respect to FIG. 3. In the example of FIG. 4, the processor 400 may include multiple summary registers per logical processor 304. Thus, processor 400 may include a machine check exception (MCE) summary register 402-1, 402-2, ..., 402-M corresponding to a respective logical processor 304, and may further include a corrected machine check interrupt (CMCI) summary register 404-1, 404-2, ..., 404-M corresponding to a respective logical processor 304.

System software may program shared registers in a consistent manner for CMCI delivery and usage. For instance, CMCI may provide capabilities beyond those of threshold-based error reporting. In some implementations of threshold-based error reporting, software may be limited to periodic polling to query the status of hardware corrected MC errors. On the other hand, CMCI may provide a signaling mechanism to deliver a local interrupt based on threshold values that software can program using the control-2 registers 322 discussed above. Although a CMCI interrupt may be delivered to more than one logical processor 304, depending on the nature of the corrected MC error, only one instance of an interrupt service routine may be performed to service and make queries to the MCA banks 308. Accordingly, in the example of FIG. 4, the CMCI summary registers 404 may be provided for indicating the presence of valid error data relating to CMCI interrupts.

Additionally, the MC handlers 306 in this example may include an MCE handler 406 and a CMCI handler 408. As mentioned above, system software 114 can attempt recovery of uncorrected recoverable (UCR) errors. UCR errors are uncorrected errors that have been detected and signaled but have not corrupted the processor context. For certain UCR errors, after system software 114 has performed a recovery action, it is possible to continue execution on the processor. UCR error reporting further provides an error containment mechanism to prevent data poisoning. The machine check handlers 306 may use the valid error data obtained from the error reporting registers to analyze and implement specific error recovery actions for UCR errors. UCR errors can be signaled through either the corrected machine check interrupt (CMCI) or machine check exception (MCE) path depending on the type of the UCR error.

The MCE handler 406 may respond to MCEs by checking the respective MCE summary register 402 to determine whether valid error data exists in the purview of the corresponding logical processor 306 with which the MCE handler 406 is associated. If the MCE summary register 402 shows that valid error data is maintained in one or more of the respective error reporting banks 312 of the logical processor 304, the MCE handler 406 may access the identified error reporting registers, log the error and/or attempt to recover from the error. Further, the CMCI handler 408 may respond to CMCI interrupts by checking the respective CMCI summary register 404 to determine whether data related to a CMCI interrupt exists in the purview of the corresponding logical processor 306 with which the CMCI handler 408 is associated. If the respective CMCI summary register 404 shows that valid interrupt data is maintained in one or more of the respective error reporting banks 312 of the logical processor 304, the CMCI handler 408 may access the identified error reporting registers, log the error and/or attempt to recover from the error.

In addition, a CMCI interrupt can be delivered to more than one logical processor 304 if multiple logical processors 304 are affected by the associated MC error. For example, when a corrected bit error in a cache shared by two logical processors 304 causes a CMCI interrupt, the interrupt may be delivered to both logical processors 304 sharing that micro-architectural sub-system. Similarly, other types of errors may cause a CMCI interrupt to be delivered to all logical processors within a particular group, package or the like. However, while a CMCI interrupt may be delivered to more than one logical processor 304, depending on the nature of the corrected MC error, only one instance of an interrupt service routine may perform the necessary service and make queries to the machine-check banks. For example, a service routine of a particular CMCI handler 408 may examine the CMCI summary register 404 to determine whether any MC banks of which it has ownership maintain valid error data. The CMCI handler 408 may further log any MC errors and clear the corresponding error reporting register.

Numerous other variations of the summary registers herein are possible. For example, each logical processor 304 may have three associated summary registers in which a first summary register may represent banks that receive valid uncorrected fatal error data, a second summary register may represent banks that receive valid uncorrected recoverable error data, and a third summary register may represent banks that receive valid corrected error data.

Figure 5:
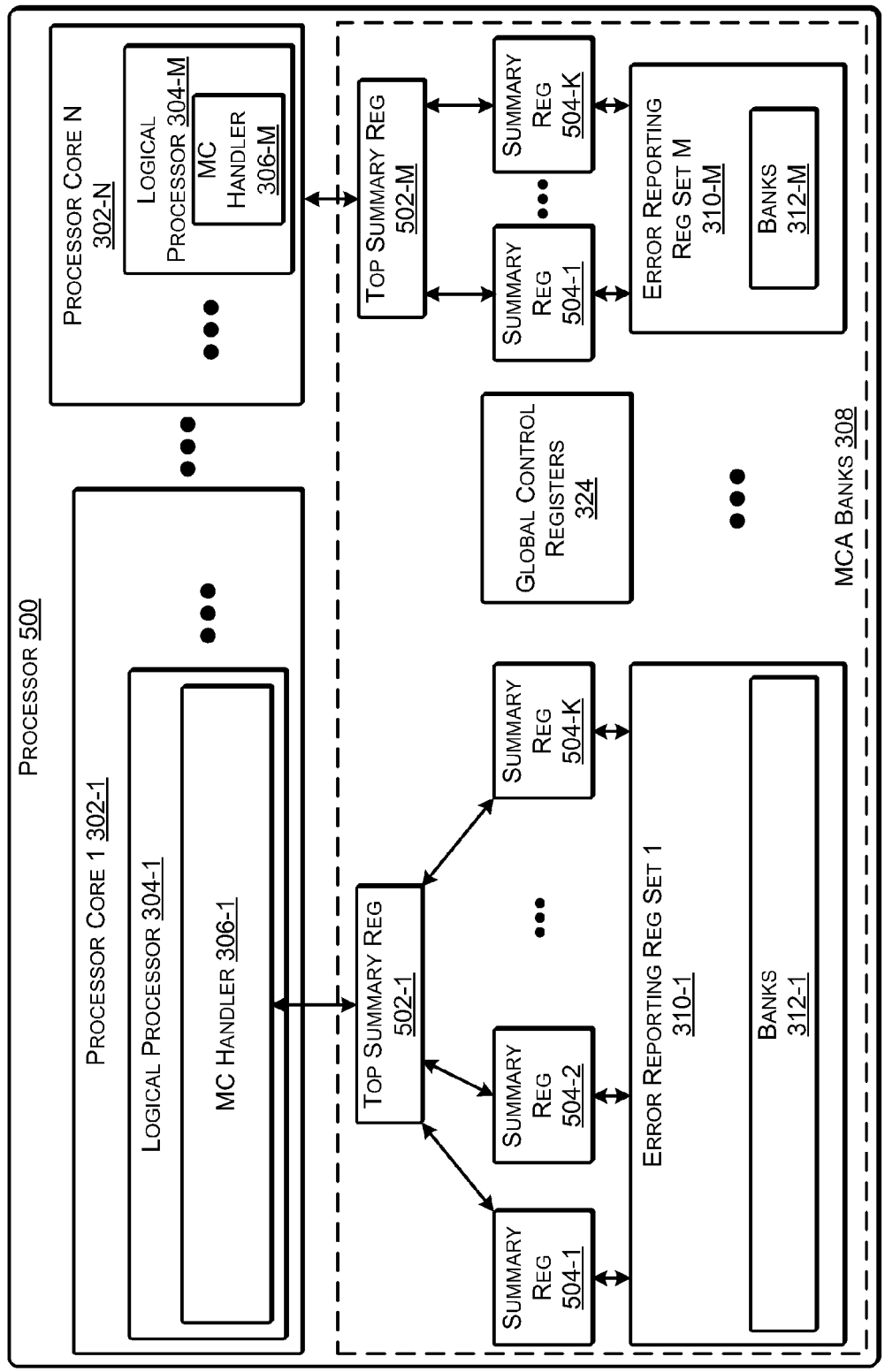
FIG. 5 illustrates an example processor architecture including a plurality of summary registers per logical processor in a hierarchical arrangement according to some implementations

FIG. 5 illustrates an example architecture of a processor 500 according to some implementations herein. The processor 500 may include the plurality of processor cores 302-1, ..., 302-N, and MCA banks 308 that include the error reporting register sets 310-1, ..., 310-M, banks 312-1, ..., 312-M, and global control registers 324, as discussed above with respect to FIG. 3. In the example of FIG. 5, the processor 500 may include a hierarchical arrangement of summary registers per logical processor 304. Thus, each logical processor 304-1, ..., 304-M may include in its view a respective top summary register 502-1, ..., 502-M. Each top summary register 502 may include a plurality of indicators corresponding to a plurality of second level summary registers 504-1, 504-2, ..., 504-K that include an indicator for each MCA bank in the banks 312-1.

As one example, suppose that the banks 312-1 corresponding to the first logical processor 304-1 include 256 MCA banks, and that each second level summary register 504 is a 64-bit register. Accordingly, there may be four second level summary registers 504 in the view of the first logical processor 304-1, and the top summary register 502-1 may include four indicators (bits) corresponding to the four second level summary registers. Accordingly, when an MC error occurs, the MC handler 306-1 for the first logical processor 304-1 may read the top summary register to determine whether there is valid error data in the MCA banks in the view of the logical processor 304-1. If there is valid error data in one of the MCA banks 312-1, the top summary register 502-1 will indicate which second level summary register 504 the MC handler 306-1 should read. Thus, the MC handler 306-1 can then read the appropriate second level summary register 504, without having to read the other second level summary registers. Consequently, the hierarchical arrangement of FIG. 5 utilizes only three register reads instead of five register reads.

The hierarchical arrangement of summary registers may be extended. For example, in some implementations, there could be a summary register for each memory subsystem and a summary register for each I/O subsystem and a global summary register for the subsystem summary registers. Furthermore, while several examples have been illustrated herein for discussion purposes, numerous other configurations may be used to provide summary registers, and thus implementations herein are not limited to the particular configurations or arrangements shown in the figures.

Example Processes

Figure 6:
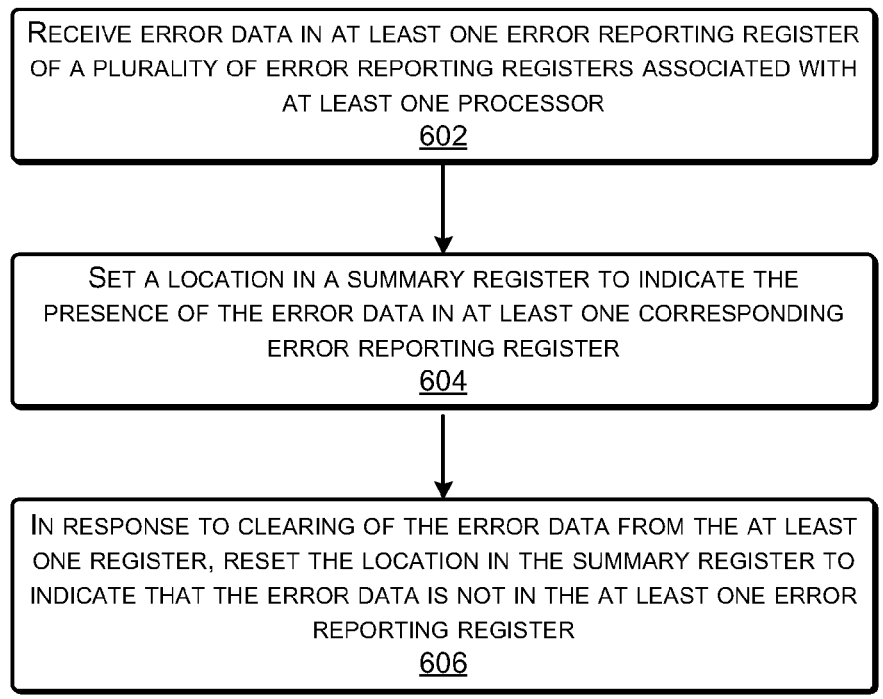
FIG. 6 is a block diagram illustrating an example process employing a summary register according to some implementations.

FIGS. 5 and 6 illustrate example processes for implementing the techniques described above. The processes are illustrated as a collection of blocks in logical flow graphs, which represent a sequence of operations, some or all of which can be implemented in hardware, software or a combination thereof. In the context of software, the blocks may represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation. Any number of the described blocks can be combined in any order and/or in parallel to implement the process, and not all of the blocks need be executed. For discussion purposes, the processes are described with reference to the architectures, frameworks and processors described in the examples herein, although the processes may be implemented in a wide variety of other architectures, frameworks or processors.

FIG. 6 is a flow diagram illustrating an example process 600 for employing one or more summary registers according to some implementations.

At block 602, at least one error reporting register of a plurality of error reporting registers associated with at least one processor receives valid error data. For example, in response to a machine check error, valid error data may be stored in at least one error reporting register associated with a logical processor, a processor core, or the like.

At block 604, logic may set a settable location in a summary register to indicate the presence of the valid error data in at least one corresponding error reporting register. For example, the summary register may have a plurality of settable locations corresponding to the plurality of error reporting registers or banks of error reporting registers. In some implementations, the plurality of settable locations may comprise a bit mask in which a bit may be set to indicate whether a corresponding error reporting register or bank of registers maintains valid error data.

At block 606, in response to clearing of the valid error data from the at least one error reporting register, the logic may reset the settable location to indicate that the error data is not in the at least one error reporting register. For example, the MC handler or other logic may clear the at least one error reporting register following logging of the valid error data in the error log. In response, the logic may clear the corresponding settable location in the summary register to no longer indicate the presence of the valid error data in the corresponding one or more error reporting registers.

Figure 7:
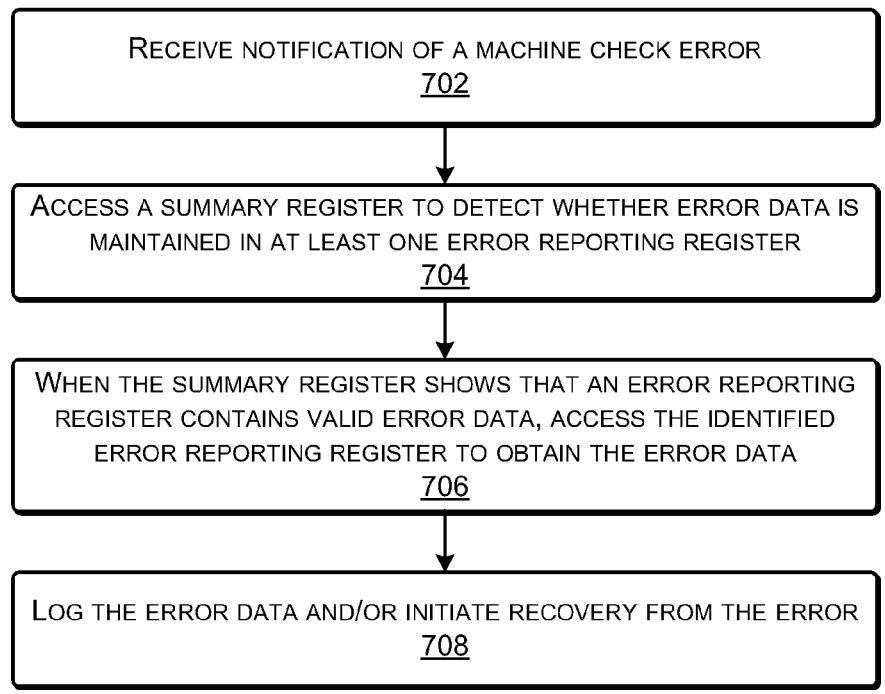
FIG. 7 is a block diagram illustrating an example process executed by a handler according to some implementations.

FIG. 7 is a flow diagram illustrating an example process 700, which may be performed by an MC handler with respect to a summary register according to some implementations.

At block 702, a processor receives notification of a machine check error. For example, when a machine check error occurs each of the processors (e.g., logical processors, processor cores, or the like) in a particular socket or in an entire system may receive a machine check exception for error containment purposes. The MC handler at the processor may receive the notification of the machine check error.

At block 704, the MC handler access a summary register to detect whether valid error data is maintained in at least one error reporting register corresponding to or owned by the processor. For example, the MC handler may perform an access to the respective summary register to determine whether valid error data is maintained in an error reporting register or bank of registers that corresponds to a particular logical processor, processor core, or the like. Further, in some examples, the MC handler may be at least one of an MCE handler or a CMCI handler, as discussed above.

At block 706, when the summary register shows that one or more of the error reporting registers contain valid error data, the MC handler may access the identified error reporting register(s) to obtain the valid error data maintained in the identified error reporting register. For example, when the summary register indicates that valid error data is maintained in a particular bank of the error reporting registers, the handler may access the particular bank of registers to obtain the valid error data without having to read each of the banks of error reporting registers corresponding to the particular processor.

At block 708, the MC handler may log the valid error data and/or initiate recovery from the machine check error. For example, in the case of an unrecoverable or fatal error, the MC handler may record the valid error data in an error log and proceed to shut down the system. Alternatively, in the case of a recoverable error, the MC handler may initiate recovery from the machine check error.

The example processes described herein are only examples of processes provided for discussion purposes. Numerous other variations will be apparent to those of skill in the art in light of the disclosure herein. Further, while the disclosure herein sets forth several examples of suitable frameworks, architectures and processors for executing the techniques and processes herein, implementations herein are not limited to the particular examples shown and discussed.

Example System Architecture

Figure 8:
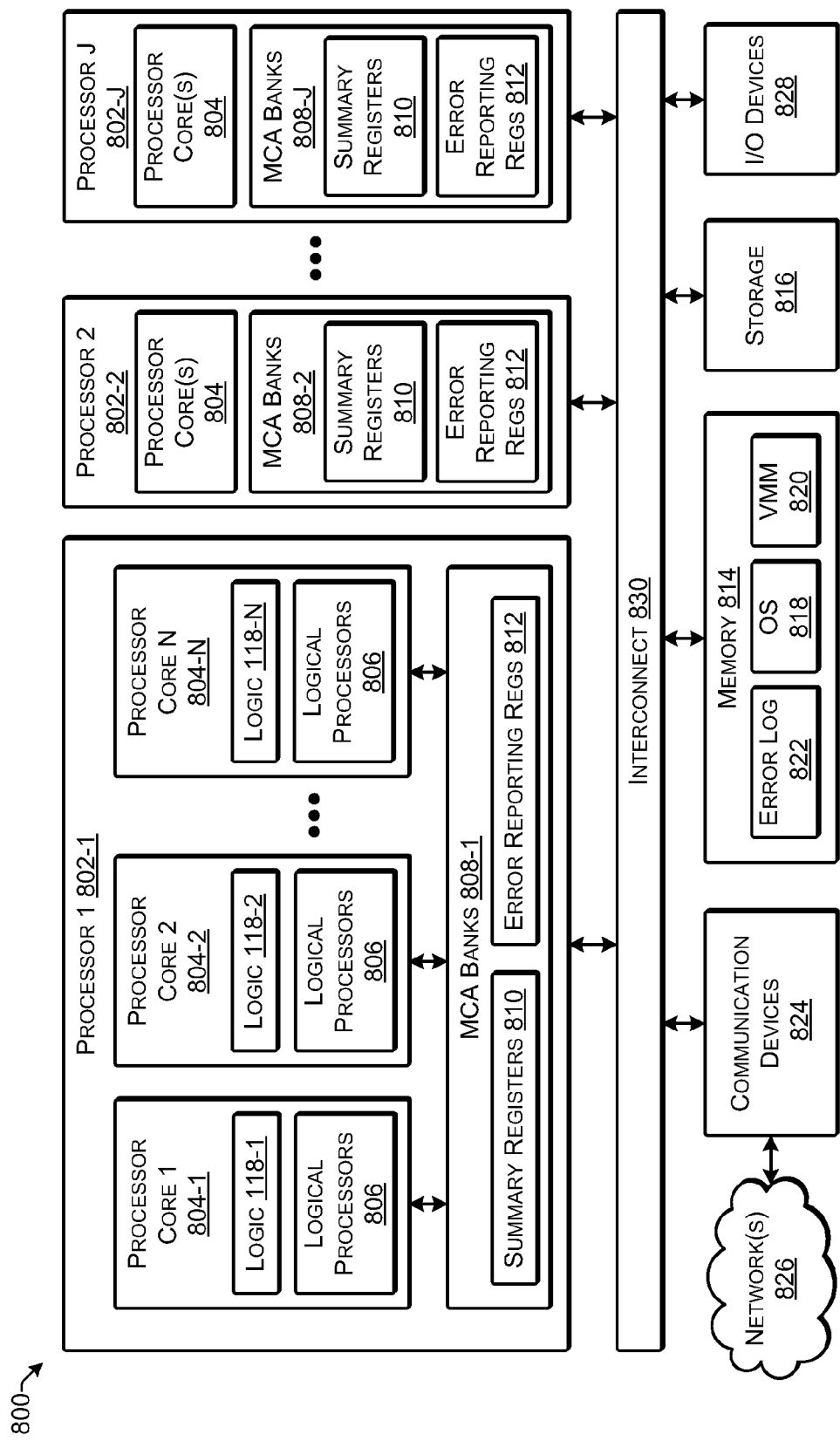
FIG. 8 illustrates an example architecture of a system including summary registers according to some implementations.

FIG. 8 illustrates nonlimiting select components of an example system 800 according to some implementations herein that may employ summary registers in a machine check architecture. The system 800 is merely one example of numerous possible systems and apparatuses that may implement summary registers, such as in the machine check architecture 100 and/or the processors 300 or 400 discussed above. The system 800 includes a plurality of processors 802-1, 802-2, . . . , 802-J (where J is a positive integer≥1), each of which may include one or more processor cores 804-1, 804-2, . . . , 804-N. In some implementations, as discussed above, a plurality of logical processors 806 may be provided by each processor core 804.

A plurality of MCA banks 808-1, 808-2, . . . , 808-J may be associated with each respective processor 802-1, 802-2, . . . , 802-J and may include one or more summary registers 810 and a plurality of error reporting registers 812. As described above, in some implementations, a summary register 810 may be provided for each logical processor 806. Furthermore, in other implementations, multiple summary registers 810 may be provided for each logical processor 806, while in yet other implementations, logical processors 806 may share a summary register 810. Numerous other variations will be apparent to those of skill in the art in view of the disclosure herein.

Furthermore, logic 118-1, 118-2, . . . , 118-N may be provided in association with the processor cores 804 and the summary registers 810 for managing the summary registers 810. For example, each processor core 804 may include an instance of the logic 118 to set one or more bits in a respective summary register when valid error data is received in one or more of the corresponding error reporting registers 812. As mentioned above, the logic 118 may include one or more of dedicated circuits, logic units, microcode, or the like.

The processors 802, processor cores 804 and/or logical processors 806 can be operated to fetch and execute computer-readable instructions stored in a memory 814 or other computer-readable media. The memory 814 may include volatile and nonvolatile memory and/or removable and non-removable media implemented in any type of technology for storage of information, such as computer-readable instructions, data structures, program modules or other data. Such memory includes, but is not limited to, RAM, ROM, EEPROM, flash memory or other memory technology. Further, storage 816 may be provided for storing data, code, programs, logs, and the like. The storage 816 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 800, the memory 814 and/or the storage 816 may be a type of computer readable storage media and may be a non-transitory media.

The memory 814 may store functional components that are executable by the processors 802. In some implementations, these functional components comprise instructions or programs that are executable by the processors 802 and, when executed, implement operational logic for performing the actions attributed to the system software discussed above. Examples of functional components illustrated in FIG. 8 include an operating system (OS) 818 and a virtual machine monitor (VMM) 820, although other types of system software may also or alternatively be employed. The OS 818 and/or the VMM 820 may implement the MC handlers described above with reference to FIGS. 1-7. The memory 814 may further maintain an error log 822 for receiving the valid error data relating to the machine check errors reported in the system 800.

The system 800 may include one or more communication devices 824 that may include one or more interfaces and hardware components for enabling communication with various other devices over a communication link, such as one or more networks 826. For example, communication devices 824 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 800 may further be equipped with various input/output (I/O) devices 828. Such I/O devices 828 may include a display, various user interface controls (e.g., buttons, joystick, keyboard, touch screen, etc.), audio speakers, connection ports and so forth. An interconnect 830, which may include a system bus, point-to-point interfaces, a chipset, or other suitable connections and components may be provided to enable communication between the processors 802, the memory 814, the storage 816, the communication devices 824, and the I/O devices 828.

In addition, this disclosure provides various example implementations, as described and as illustrated in the figures. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A processor comprising:
   a plurality of error reporting registers to each receive error data for a machine check error, wherein the error reporting registers include a control register to control error reporting for machine check errors produced by a particular hardware unit or group of hardware units, an address register to contain the address of the code or data memory location that produced a particular machine check error, a miscellaneous register to contain additional information describing the machine check error to support software recovery of uncorrected errors, a status register to contain information related to a machine check error if its valid flag is set; and
   a summary register having settable locations to represent each of the error reporting registers, the settable locations to indicate which of the plurality of the error reporting registers to maintain the error data.

2. The processor as recited in claim 1, wherein:
   the plurality of error reporting registers are arranged in multiple banks, each bank including at least one error reporting register of the plurality of error reporting registers; and
   each settable location in the summary register corresponds to one of the banks of the multiple banks.

3. The processor as recited in claim 1, in which the settable locations in the summary register are to include one or more settable bits to indicate that the error data is maintained in one or more particular error reporting registers.

4. The processor as recited in claim 1, further comprising logic to set a particular settable location in the summary register in response to receipt of the error data in one or more particular error reporting registers represented by the particular location.

5. The processor as recited in claim 1, further comprising multiple processor cores, wherein the summary register is a first summary register to represent a first set of the error reporting registers corresponding to a first processor core of the multiple processor cores.

6. The processor as recited in claim 5, further comprising multiple logical processors corresponding to the first processor core, wherein first summary register and the first set of the error reporting registers correspond to a first logical processor of the multiple logical processors.

7. The processor as recited in claim 6, further comprising a second summary register to represent a second set of the error reporting registers corresponding to a second logical processor of the multiple logical processors of the first processor core of the multiple processor cores.

8. The processor as recited in claim 1, further comprising a handler executable by the processor to access the summary register to detect whether one or more of the error reporting registers maintains the error data.

9. The processor as recited in claim 1, in which the summary register is a first summary register to represent a first type of error data, the processor further comprising a second summary register to represent a second type of error data.

10. A method comprising:
    receiving error data in a register of a plurality of registers associated with at least one processor, wherein the plurality of registers include a control register to control error reporting for machine check errors produced by a particular hardware unit or group of hardware units, an address register to contain the address of the code or data memory location that produced a particular machine check error, a miscellaneous register to contain additional information describing the machine check error to support software recovery of uncorrected errors, a status register to contain information related to a machine check error if its valid flag is set;

setting a location in a summary register to indicate a presence of the error data in one of the plurality of registers, the summary register having a plurality of settable locations each corresponding to the plurality of registers;

in response to a notification of an error, accessing the summary register to identify the register of the plurality of registers that received the error data; and based at least in part on the accessing the summary register, reading the at least one register that received the error data.

11. The method as recited in claim 10, further comprising, in response to clearing of the error data from the at least one register, resetting the settable location in the summary register to indicate that the error data is not in the register.

12. The method as recited in claim 10, further comprising at least one of:

storing the error data in an error log; or initiating recovery from the error.

13. The method as recited in claim 10, wherein setting the settable location comprises setting a bit at the settable location to indicate the presence of the error data in the at least one register.

14. A system comprising:

at least one processor core;

a plurality of register banks associated with the at least one processor core to receive error data, wherein each of the plurality of register banks includes a control register to control error reporting for machine check errors produced by a particular hardware unit or group of hardware units, an address register to contain the address of the code or data memory location that produced a particular machine check error, a miscellaneous register to contain additional information describing the machine check error to support software recovery of uncorrected errors, a status register to contain information related to a machine check error if its valid flag is set;

a summary register having a plurality of indicators corresponding to the plurality of register banks, a respective indicator of the plurality of indicators to indicate presence of error data in a corresponding register bank; and a register to provide information about a machine check architecture of the at least one processor core.

15. The system as recited in claim 14, wherein the summary register is a first summary register of multiple summary registers, the first summary register to correspond to a first processor core of the multiple processor cores.

16. The system as recited in claim 15, further comprising:

multiple logical processors, including at least a first logical processor and a second logical processor to be provided using the first processor core, the first summary register representing a first plurality of register banks corresponding to the first logical processor; and a second summary register representing a second plurality of register banks corresponding to the second logical processor.

17. The system as recited in claim 16, in which there are multiple first summary registers representing the first plurality of register banks corresponding to the first logical processor, and another summary register representing at least the multiple first summary registers.

18. The system as recited in claim 14, further comprising:

each processor core providing a plurality of logical processors; and a plurality of the summary registers, at least one summary register corresponding to each logical processor to represent respective register banks corresponding to each logical processor.

* * * * *